H. P. HOLM.
COOKING UTENSIL.
APPLICATION FILED NOV. 18, 1910.
1,028,726.
Patented June 4, 1912.
2 SHEETS—SHEET 1.
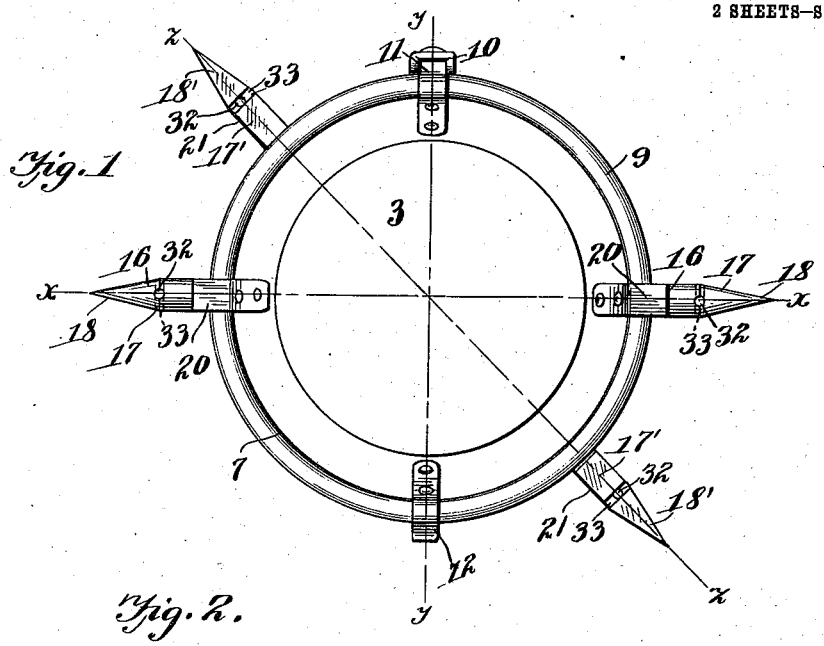
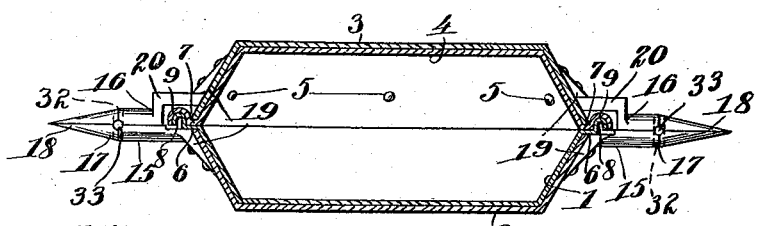
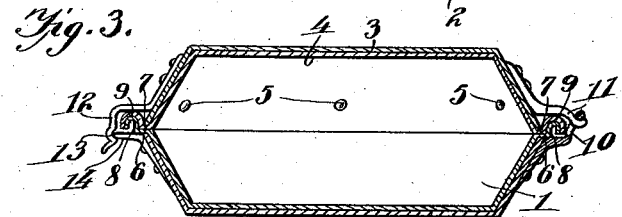
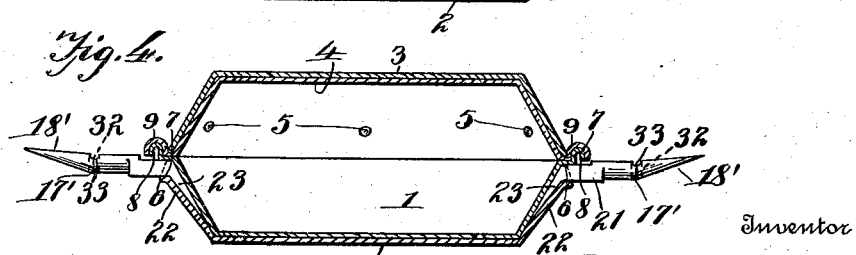
Witnesses
William C. Linton
J. T. Austin
Inventor
Hans P. Holm
By
Joshua R. H. Potts
Attorney H. P. HOLM.
COOKING UTENSIL.
APPLICATION FILED NOV. 18, 1910.
1,028,726.
Patented June 4, 1912.
2 SHEETS—SHEET 2.
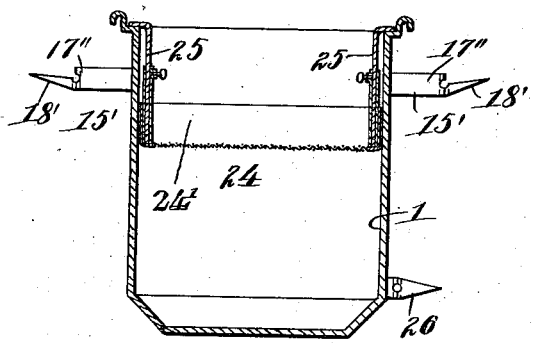
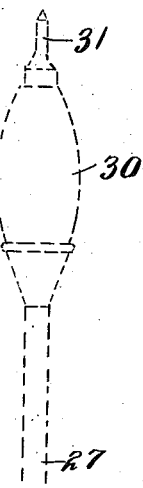
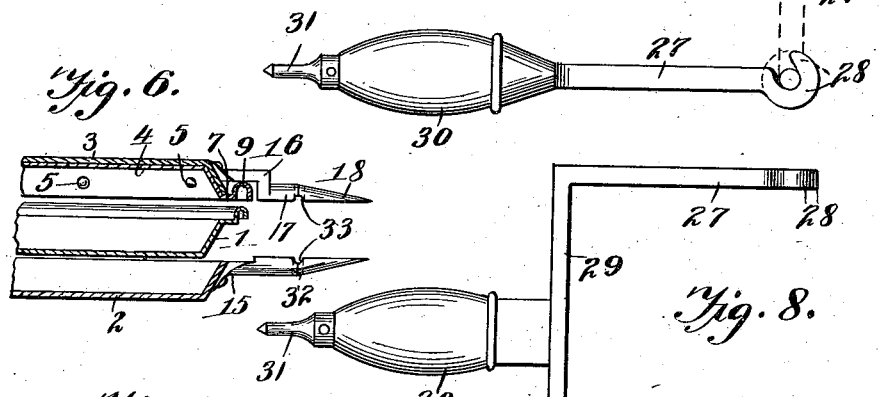
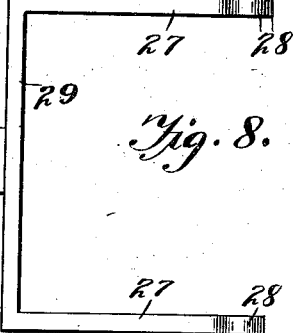
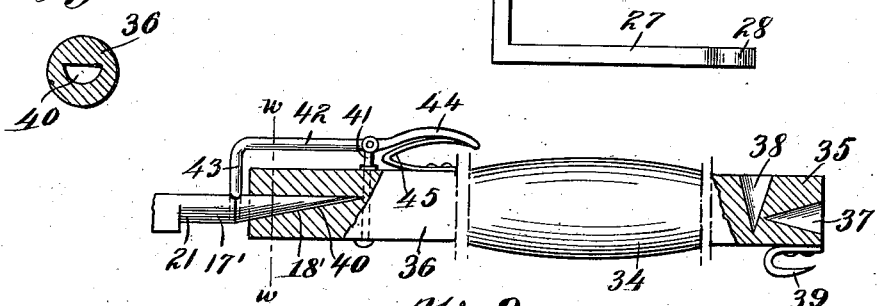
Witnesses
William C. Linton.
T. K. B. Austin
Inventor
Hans P. Holm.
By Joshua R. H. Potts
Attorney

UNITED STATES PATENT OFFICE.

HANS P. HOLM, OF HAMPTON, IOWA.

COOKING UTENSIL.

1,028,726.  Specification of Letters Patent.  Patented June 4, 1912.

Application filed November 18, 1910. Serial No. 593,009.

*To all whom it may concern:*

Be it known that I, HANS P. HOLM, a citizen of the United States, residing at Hampton, county of Franklin, and State of Iowa, have invented certain new and useful Improvements in Cooking Utensils, of which the following is a specification.

My invention relates to cooking utensils and the object of my invention is to provide an improved cooking utensil in which the receptacle which contains the food shall remain clean and free from soot and dirt as is unavoidable in such devices as are exposed directly to the fire.

A further object of my invention is to provide an improved device of the class mentioned whereby, after the food is cooked, it may be removed from the stove in a clean sootless vessel in which it has been cooked and which vessel shall have a cool or cold handle.

A further object of my invention is to provide a cooking utensil characterized as above stated which may be turned or inverted to cook the food upon opposite sides without the necessity of opening the utensil or removing the food.

A further object of my invention is to provide a cooking utensil of the class under consideration particularly adapted for frying meats or other articles of food without loss of the natural juices of the food.

A further object of my invention is to provide a cooking utensil equipped with a novel detachable handle.

Other objects will appear hereinafter.

With these objects in view my invention consists generally in a cooking utensil comprising an inner member or food receptacle and an outer member or jacket fitting snugly about the former.

My invention further consists in a jacketed separable utensil as mentioned provided with a lined closure or cover, the food receptacle and the lining of the cover being extended at their edges and formed with interlocking portions forming tight joints between them.

My invention further consists in a cooking utensil comprising a receptacle and a cover each provided with oppositely extending registering projections which together form trunnions having longitudinal extensions, a separable or detachable lifter having bearings to engage the trunnions and a device for engaging the extensions for turning the utensil.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a plan view of a cooking utensil embodying my invention, Fig. 2 is a section on the line $x$—$x$ of Fig. 1, Fig. 3 is a section on the line $y$—$y$ of Fig. 1, Fig. 4 is a section on the line $z$—$z$ of Fig. 1, Fig. 5 is a similar section of a modified form of food receptacle, Fig. 6 is a detail view illustrating the several parts of the device separated, Fig. 7 is a side view of the lifting device, Fig. 8 is a plan view thereof, Fig. 9 is a side elevation partially in section of the combined turning and lifting device, and Fig. 10 is a section on the line $w$—$w$ of Fig. 9.

Referring now to the drawing 1 indicates the food receptacle which may be of any desired shape or size. As shown in Figs. 2, 3 and 4 it consists of a utensil of moderate depth, whereas in Fig. 5 it is shown of considerable depth for cooking bulky articles and in Fig. 6 as very shallow for frying. The receptacle 1 is provided with an outer member or jacket 2 which fits snugly about the receptacle 1, preferably contacting its entire outer surface. The device is provided with a closure or cover 3 having a lining 4 similar to the receptacle 1, but preferably permanently secured thereto as by rivets 5, whereas the receptacle 1 is readily removable from the outer member or jacket 2.

The receptacle 1 and lining 4 are each provided with peripheral flanges 6 and 7 respectively terminating at their outer edges in upwardly extending well rounded beads 8 and 9, the former fitting snugly within the latter when the parts are together forming substantially steam tight joints. The jacket 2 and cover 3 terminate at the outer faces of the portions 6 and 7 respectively as shown clearly in the drawing. This also serves to prevent the contents of the vessel from spilling when the vessel is being inverted as will be described hereinafter.

The jacket 2 and cover 3 are provided with detachable hinge members 10 and 11 respectively and the cover is provided with a spring catch 12 having a notch 13 to engage a lug or keeper 14 on the part 2. The catch and keeper are diametrically opposite from the hinge members and together with the same afford means for securing the device in closed position.

Fixed to the cover 3 and the jacket 2 are oppositely disposed radially projecting members 15 and 16 which register to form cylindrical trunnions 17 and tapered extensions 18. The members 15 and 16 are provided with base plates 19 for securing them to the respective portions of the device and the members 16 are off set as at 20 to clear the portions 8 and 9. The function of the portions 17 and 18 will appear hereinafter.

The receptacle 1 is provided with extensions 21 similar to the members 15 with the exception that the conical portion 18' is inclined slightly upwardly although the semi-cylindrical portions 17' are preferably horizontal. The portions 17' and 18' are preferably at the same distance from the center of the device as the portions 17 and 18. The jacket 2 is provided with lips 22 to receive the attaching portion 23 of the members 21, and said lips are disposed at an angle from the members 15 in order that the projections 21 shall not interfere with the lifting and turning of the device as a whole as will appear hereinafter.

When a deep receptacle is used, such as illustrated in Fig. 5, a member or auxiliary receptacle 24' may be used having a foraminated bottom 24 and a pair of adjustable hangers 25 which engage the upper edge of the receptacle 1. In this form of device the projections 15' are below the upper edge of the device to permit of more readily turning the receptacle on the trunnions. 26 indicates a projection adjacent the lower end of the receptacle 1 to be engaged by the turning device to facilitate tilting the receptacle when it is desired to pour the contents therefrom. The projections 15' preferably consist of a cylindrical portion 17'' and an upwardly extending or inclined semi-conical extension 18'.

The receptacle is provided with a lifting device and a combination lifter and turning device. The lifting device comprises a yoke consisting of a pair of parallel arms 27 terminating at their ends in hooks 28, a transverse connecting portion 29 and a handle 30. The hooks 28 are adapted to engage the cylindrical portions or trunnions 17 or 17' or 17'' as the case may be, and are inclined backwardly as shown in Fig. 7 in order that they will support or hold the utensil whether in horizontal position as illustrated in full lines in said figure or in vertical position as shown in dotted lines therein. The end of the handle is provided with a spike or point 31 which may be utilized to assist in separating the several parts of the device. It should be noted at this point that the projections 15 and 16 are provided with both vertical and transverse, preferably cylindrical, apertures 32 and 33 respectively, the latter being formed half in the portion 15 and half in the portion 16, forming transverse registering grooves. It is obvious that by inserting the point 31 in the aperture 33 the lid or closure may be readily removed or lifted from the receptacle and its jacket.

The combination lifter and turning device comprises a handle 34 having longitudinal extensions 35 and 36 at the opposite ends thereof. The extension 35 is provided in the end and one side thereof with conical sockets 37 and 38 respectively which are adapted to engage the conical extensions 18. It is obvious that while the device is supported on its trunnions by the hooks 28, it may be readily turned by inserting one of the projections 18 in one of the sockets 37 or 38 and turning the handle. By having the sockets 37 and 38 extending longitudinally and transversely of the extension 35, the handle 34 may be used in its most convenient position. 39 indicates a hook on the end of the turning device which may be used for the same purpose as the pointed end 31 of the lifting device, that is for separating the parts of the utensil. The portion 36 is provided with a semi-conical socket 40 adapted to engage or receive the extension 18' of the receptacle whereby the handle 34 may be attached to the receptacle for lifting the same from its jacket 2. Pivotally mounted in a bracket 41 on the extension 36 is a latch or lever 42 having a downwardly extending end 43 adapted to engage the aperture 32 in the extension 21, for securely holding the handle on the receptacle. The other end of the lever 42 is formed into a thumb piece 44 between which and the portion 36 is a spring 45. By pressing on the thumb piece 44 the handle may be readily disengaged from the receptacle.

In using the device the receptacle 1 is placed within the jacket 2 and the cover placed in position and secured by the hinge and latch above described. The device is then placed upon the fire or stove to cook the food. When it is desired to turn the food, as when frying, the device is lifted by means of the device 27—30, the hooks 28 thereof engaging the trunnions and the turning device placed upon one of the extensions 18 and the handle 34 thereof turned as before mentioned. After the food is cooked the cover is removed and the handle 34 secured on the extension 21 by means of the latch 42, after which the receptacle 1 may be removed from the jacket and the receptacle will be bright and clean and free from soot.

Having described my invention what I claim as new and desire to secure by Letters Patent is:

1. A cooking utensil comprising a receptacle, a cover for said receptacle, peripheral flanges on said receptacle and said cover respectively, the edges of said flanges being rolled to form co-acting portions forming a tight joint between them, close fitting jackets for said cover and said receptacle respectively, the jacket for the receptacle being separable therefrom, a hinge connection between said jackets and a latch for securing said jacket in closed position, substantially as described.

2. In a cooking utensil, a receptacle, a close fitting jacket for said receptacle, a cover adapted to fit snugly on said receptacle, oppositely disposed projections on said jacket and said cover adapted to register with each other and together forming cylindrical trunnions and conical extensions, in combination with a lifting device provided with hooks to engage said trunnions, and a turning device comprising a handle having a socket to engage said conical extension, substantially as described.

3. In a cooking utensil, a receptacle, a close fitting jacket for the same, a cover, projections on said jacket and said cover adapted to register to form trunnions for the utensil, a projection on said utensil provided with a vertical aperture, said jacket being recessed to permit protrusion of said projection, a handle provided with a socket to receive the projection on the receptacle, and a latch on said handle adapted to engage said aperture, substantially as described.

4. In a cooking utensil, upper and lower members, projections on said members adapted to register to form trunnions for the device and said projections being provided with transverse apertures formed part in each projection to permit insertion of an instrument between the parts of the trunnions for separation of the members, substantially as described.

In testimony whereof I have signed my name to this specification in the presence of two subscribing witnesses.

HANS P. HOLM.

Witnesses:
O. F. MYERS,
A. W. WOLF.

Copies of this patent may be obtained for five cents each, by addressing the "Commissioner of Patents, Washington, D. C."